US010990578B2

(12) United States Patent
Banatwala et al.

(10) Patent No.: US 10,990,578 B2
(45) Date of Patent: Apr. 27, 2021

(54) CONTENT FOLLOWING CONTENT FOR PROVIDING UPDATES TO CONTENT LEVERAGED IN A DECK

(71) Applicant: INTERNATIONAL BUSINESS MACHINES CORPORATION, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 15/068,070

(22) Filed: Mar. 11, 2016

(65) Prior Publication Data

US 2016/0299931 A1  Oct. 13, 2016

Related U.S. Application Data

(63) Continuation of application No. 14/684,053, filed on Apr. 10, 2015, now Pat. No. 10,838,943.

(51) Int. Cl.
*G06F 16/23* (2019.01)
*G06F 16/2455* (2019.01)
*G06F 16/958* (2019.01)

(52) U.S. Cl.
CPC .......... *G06F 16/23* (2019.01); *G06F 16/2358* (2019.01); *G06F 16/2379* (2019.01); *G06F 16/24568* (2019.01); *G06F 16/958* (2019.01)

(58) Field of Classification Search
CPC ............... G06F 16/23; G06F 16/24568; G06F 16/2379; G06F 16/958; G06F 16/2358

USPC .......................................................... 707/700
See application file for complete search history.

(56) References Cited

U.S. PATENT DOCUMENTS

| 7,900,228 | B2* | 3/2011 | Stark ................. H04N 5/44543 348/563 |
| 8,412,707 | B1 | 4/2013 | Mianji |
| 9,176,938 | B1* | 11/2015 | Kerschen ............. G06F 17/2235 |
| 2002/0133464 | A1* | 9/2002 | Ress ..................... G06Q 30/02 705/51 |
| 2006/0206501 | A1 | 9/2006 | MacLaurin |

(Continued)

OTHER PUBLICATIONS

International Business Machines Corporation, "List of IBM Patents or Patent Applications Treated As Related," submitted Mar. 14, 2016, 2 Pages.

*Primary Examiner* — Evan Aspinwall
(74) *Attorney, Agent, or Firm* — Ewa M. Wozniak

(57) ABSTRACT

A method for providing updates for pieces of content in a deck may include creating, by a processor, a deck. The deck may include a plurality of pieces of content. The method may also include leveraging, by the processor, a part of existing content, existing before creation of the deck, for at least one of the plurality of pieces of content in the deck. The at least one of the plurality of pieces of content in the deck, that leverages the part of existing content, is leveraged content and the part of the existing content is referenced content. The method may additionally include configuring, by the processor, the leveraged content for following the referenced content or ancillary content of the referenced content to obtain updates or notifications of updates to the referenced content or ancillary content.

17 Claims, 5 Drawing Sheets

(56) References Cited

U.S. PATENT DOCUMENTS

| | | |
|---|---|---|
| 2008/0263610 A1 | 10/2008 | Murray et al. |
| 2009/0228774 A1 | 9/2009 | Matheny et al. |
| 2010/0262599 A1* | 10/2010 | Nitz .................... G06F 17/3087 707/723 |
| 2011/0307478 A1 | 12/2011 | Pinckney et al. |
| 2012/0009903 A1* | 1/2012 | Schultz ............. H04M 1/72519 455/412.2 |
| 2012/0036213 A1 | 2/2012 | Tiu, Jr. et al. |
| 2012/0078906 A1 | 3/2012 | Anand et al. |
| 2013/0024465 A1 | 1/2013 | Schiff et al. |
| 2013/0036112 A1 | 2/2013 | Poon |
| 2013/0063442 A1* | 3/2013 | Zaman .................... G06T 11/40 345/441 |
| 2013/0063490 A1* | 3/2013 | Zaman .................... G06F 16/168 345/649 |
| 2013/0073568 A1 | 3/2013 | Federov et al. |
| 2013/0103697 A1 | 4/2013 | Hill et al. |
| 2013/0110978 A1* | 5/2013 | Gordon ............. H04N 21/2665 709/218 |
| 2013/0124504 A1 | 5/2013 | Haugen et al. |
| 2013/0132727 A1 | 5/2013 | Petrovic |
| 2013/0204886 A1 | 8/2013 | Faith et al. |
| 2013/0238699 A1 | 9/2013 | Reed |
| 2013/0254305 A1 | 9/2013 | Cheng et al. |
| 2013/0290234 A1 | 10/2013 | Harris et al. |
| 2013/0290516 A1 | 10/2013 | Eaton et al. |
| 2013/0297590 A1 | 11/2013 | Zukovsky et al. |
| 2013/0318156 A1 | 11/2013 | Friedman et al. |
| 2014/0019545 A1 | 1/2014 | Kosugi et al. |
| 2014/0040243 A1 | 2/2014 | Rubinstein et al. |
| 2014/0066044 A1 | 3/2014 | Ramnani et al. |
| 2014/0067814 A1 | 3/2014 | Palmert et al. |
| 2014/0068677 A1 | 3/2014 | Rimon et al. |
| 2014/0075275 A1 | 3/2014 | Aleksandrovsky et al. |
| 2014/0089287 A1 | 3/2014 | Connolly et al. |
| 2014/0173070 A1* | 6/2014 | Morrison ................ H04L 65/40 709/223 |
| 2014/0188766 A1* | 7/2014 | Waldman .......... G06F 17/30994 705/400 |
| 2016/0299941 A1 | 10/2016 | Banatwala et al. |

* cited by examiner

US 10,990,578 B2

CONTENT FOLLOWING CONTENT FOR PROVIDING UPDATES TO CONTENT LEVERAGED IN A DECK

BACKGROUND

Aspects of the present invention relate to monitoring and managing updates to content, and more particularly to a method, system and computer program product for content following content for providing updates to content that is leveraged or used in a deck.

There is a need or desire by users for keeping up to date on content that is being created in a system or network by other users. To address this need or desire, communications software products, such as social software products, offer the concept of following. Following enables a user to indicate an interest in certain pieces of content available in the system or network where the user wants the system to bring changes in those pieces of content to the attention of the user. Attention management has taken different forms ranging from sending emails to the user to presenting activity streams directed to the user, and even as far as being able to take action on the changes by the user from within an embedded experience in an activity stream, enabling the user to keep context and absorb and take action on changes to content. Accordingly, while the concept of a user following a piece of content may be implemented, a problem that is not addressed is content following content. Currently, the user has to follow the necessary pieces of content and then the user must stitch or assemble together the relevant updates and create a package of these updates that may relate to some content that the user may have created. For example, a user may create a document or presentation for a particular audience. The document or presentation may use material from existing content from other sources that may be modified for the intended audience. The material may leverage or use content or pieces of content from other documents or presentations. Traditionally, the user or author reviews the other documents or asks the relevant people for input and puts together the document. Over time, the supporting content or pieces of content that were used to create the document may change and the author or user may need to revise or redo the original document.

BRIEF SUMMARY

According to one embodiment of the present invention, a method for providing updates for pieces of content in a deck may include creating, by a processor, a deck. The deck may include a plurality of pieces of content. The method may also include leveraging, by the processor, a part of existing content, existing before creation of the deck, for at least one of the plurality of pieces of content in the deck. The at least one of the plurality of pieces of content in the deck that leverages the part of existing content is leveraged content and the part of the existing content is referenced content. The method may additionally include configuring, by the processor, the leveraged content for following the referenced content or ancillary content of the referenced content to obtain updates or notifications of updates to the referenced content or ancillary content. Therefore, an advantage of the method is that leveraged pieces of content in the deck are configured for following the parts of referenced content or ancillary content on a system or available through a communications network for providing updates for the leveraged content in the deck. Another advantage of embodiments of the present invention of the leveraged content following the referenced content is that the user does not have to take any action to indicate an interest in particular content or pieces of content as would be the case with the user following content.

According to another embodiment of the present invention, a system for providing updates for pieces of content in deck may include a processor and a module operating on the processor for providing updates for pieces of content in deck. The module may be configured to perform a set of functions including creating a deck. The deck may include a plurality of pieces of content. The set of functions may also include leveraging a part of existing content, existing before creation of the deck, for at least one of the plurality of pieces of content in the deck. The at least one of the plurality of pieces of content in the deck that leverages the part of existing content may be defined as leveraged content and the part of the existing content may be defined as referenced content. The set of functions may additionally include configuring the leveraged content for following the referenced content or ancillary content of the referenced content to obtain updates or notifications of updates to the referenced content or ancillary content. At least one advantage of the system is that leveraged pieces of content in the deck are configured for following the parts of referenced content or ancillary content for providing updates for the leveraged content in the deck.

According to another embodiment of the present invention, a computer program product for providing updates for pieces of content in deck may include a computer readable storage medium having program instructions embodied therewith. The computer readable storage medium is not a transitory medium per se, the program instructions may be executable by a device to cause the device to perform a method that may include creating a deck. The deck may include a plurality of pieces of content. The method may also include leveraging a part of existing content, existing before creation of the deck, for at least one of the plurality of pieces of content in the deck. The at least one of the plurality of pieces of content in the deck that leverages the part of existing content may define leveraged content and the part of the existing content may define referenced content. The method may additionally include configuring the leveraged content for following the referenced content or ancillary content of the referenced content to obtain updates or notifications of updates to the referenced content or ancillary content. An advantage of the computer program product is that leveraged pieces of content in the deck are configured for following the parts of referenced content or ancillary content on a system or available through a communications network for providing updates for the leveraged content in the deck.

In some other embodiments of the present invention and in combination with any of the above embodiments, the leveraged content being configured to follow the referenced content or ancillary content may include subscribing the leveraged content to receive updates or notifications of updates to the referenced content or ancillary content. Updates to the referenced content or ancillary content may be detected by the system or process method and the updates or notifications of updates may be automatically transmitted to the leveraged content. The updates or notifications of updates may be stored in a memory in association with the leveraged content. An advantage of these features is that the leveraged content may then automatically receive updates or notifications of updates to the referenced content or ancillary content and the updates or notifications are stored in association with the leveraged content to facilitate access by the user and use by the user in updating the deck.

In some other embodiments of the present invention and in combination with any of the above embodiments, the leveraged content configured to follow the referenced content or ancillary content may include the leveraged content being configured or transformed to periodically transmit a request to the corresponding referenced content for any updates. The updates may then be transmitted to the leveraged content and stored in a memory in association with the leveraged content to facilitate access and use by the user in revising the deck.

In some other embodiments of the present invention and in combination with any of the above embodiments, an integrated contextual activity stream may be created. The integrated contextual activity stream may include a list of updates or notifications of updates to the referenced content or ancillary content. The integrated contextual activity stream may be presented to the user in response to a predetermined action or event. The list of updates or notification of updates may be in a particular order or ranking. For example, the updates or notifications of updates may be in chronological order, either from most recent to oldest or oldest to most recent. In another embodiment, the updates or notifications of updates may also be in order of importance based on a predetermined criterion, such as subject matter of the update or other criteria. One advantage of these features is that a user can view a history or sequence of updates or notifications of updates to the referenced content. The user may edit the leveraged content in the deck based on the updates or notifications of updates to the corresponding referenced content, or the user may select which updates to the referenced content may be used to revise the corresponding leveraged content in the deck.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
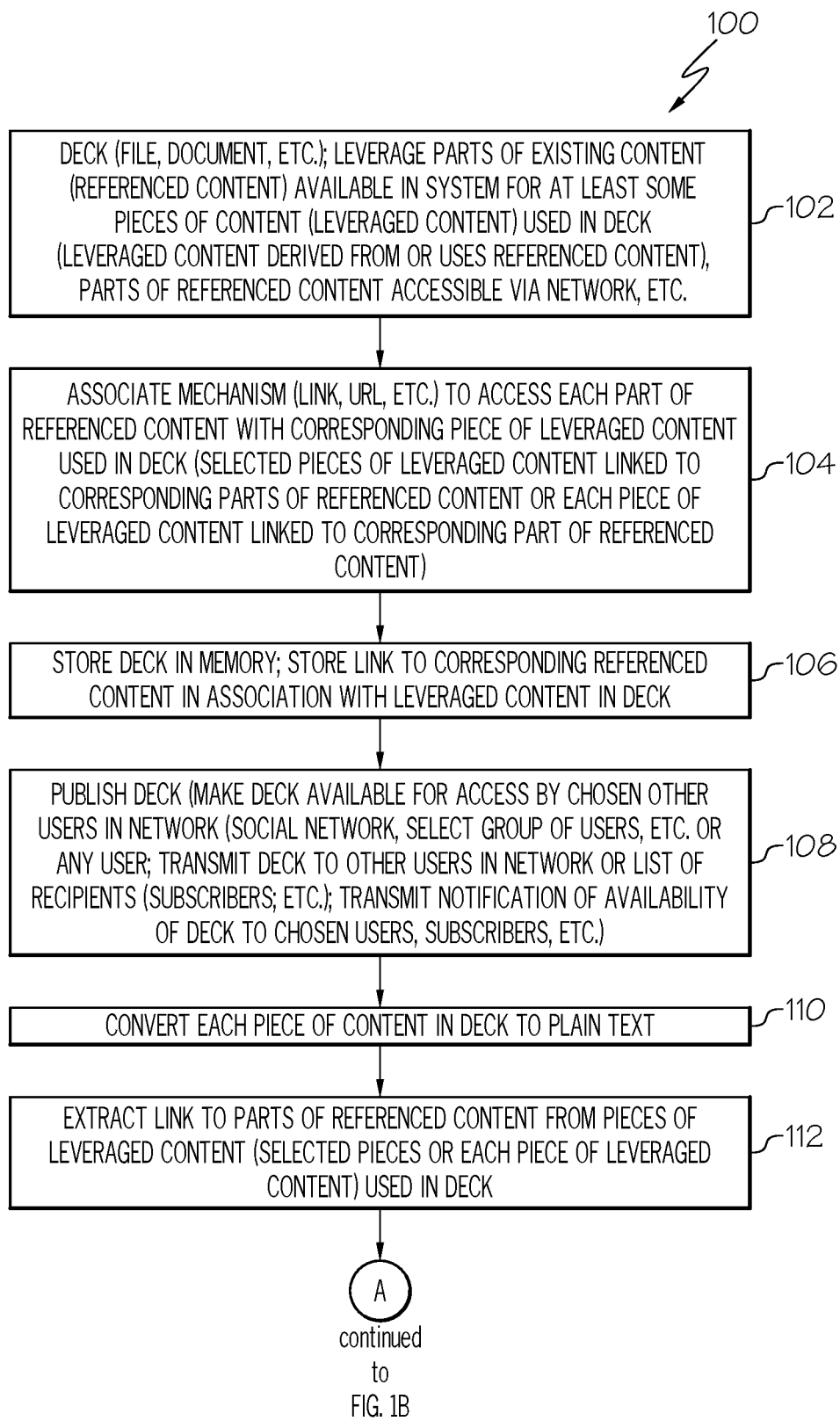
FIGS. 1A-1B (collectively FIG. 1) are a flow chart of an example of a method for content following content to provide updates made to parts of referenced content that correspond to pieces of leveraged content in a deck in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
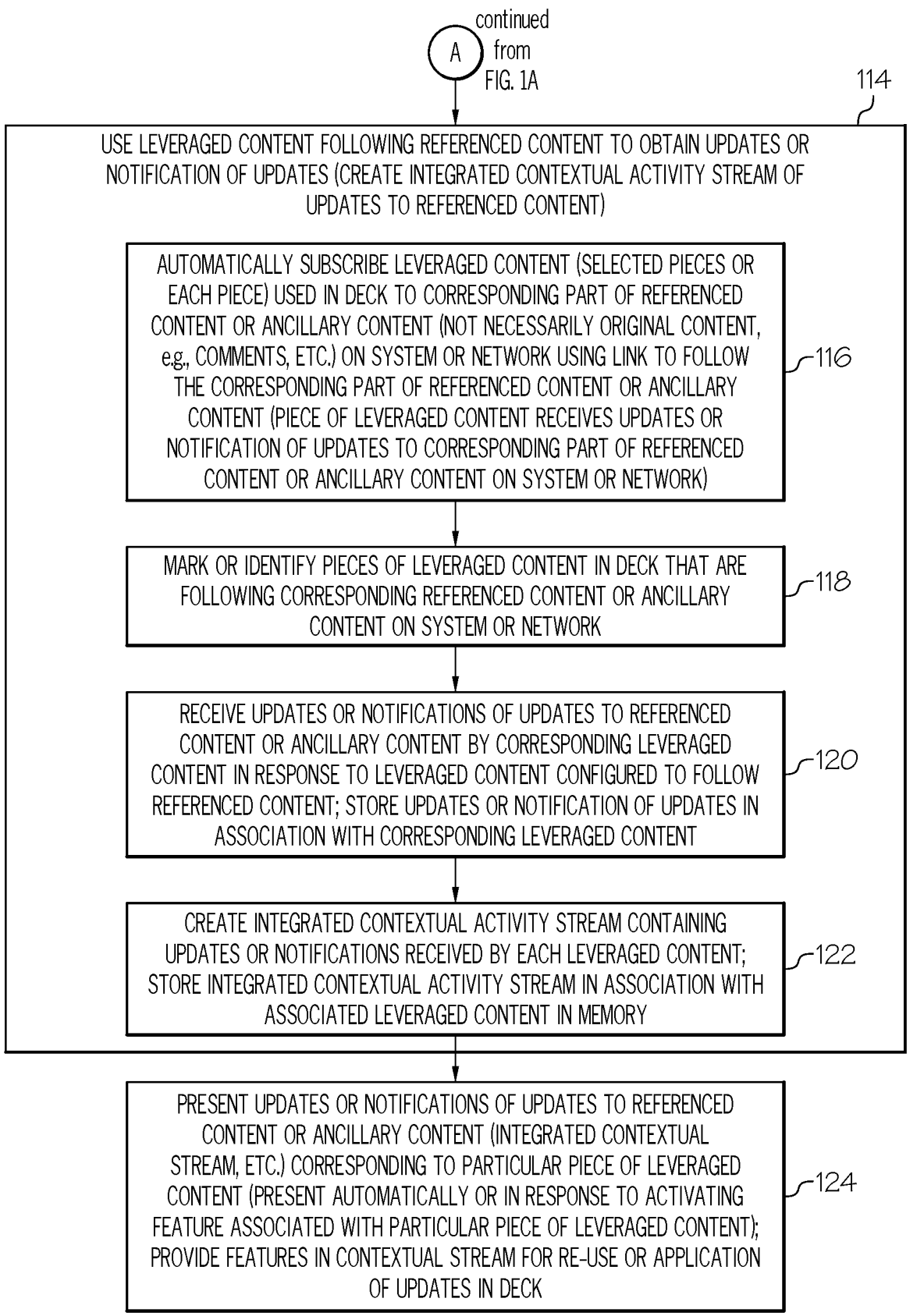

FIGS. 1A-1B (collectively FIG. 1) are a flow chart of an example of a method 100 for content following content to provide updates made to parts of referenced content that correspond to pieces of leveraged content in a deck in accordance with an embodiment of the present invention. In block 102, a deck may be created that includes a plurality of pieces of content. A deck may include but is not necessarily limited to a file, document, presentation, blog, wiki, forum, web page or other work, in electronic form. The deck may be created using a word or document processing software program or application, such as Microsoft Word, PowerPoint or other creation or processing software for creating any of the examples of a deck in the non-exhaustive list. Microsoft, Word and PowerPoint are trademarks of Microsoft Corporation in the United States, other countries or both. The deck may also include a multiple pages or slides each containing pieces of content.

One or more parts of existing content available in a system or network may be leveraged or used by a user or author of the deck for one or more of the pieces of content in the deck. The existing content is content that is available at the time of creation of the deck or any revisions to the deck at a later time. The one or more pieces of content in the deck that are leveraged by existing content available in the system or network may be defined herein as leveraged content. The one or more parts of existing content available in the system or network that are used to leverage content in the deck may be defined herein as referenced content. The leveraged content or pieces of leveraged content may correspond to or may be the same as the referenced content or respective parts of referenced content, or the leveraged content or pieces of leveraged content may be derived from the referenced content. The leveraged content may also correspond to ancillary content of the referenced content. An example of ancillary content may be content that is not the original referenced content.

The referenced content or parts of referenced content that may be used to leverage the leveraged content or pieces of leveraged content in the deck may include but is not necessarily limited to files, documents, presentations, blogs, wikis, forums, web pages, other decks or other works. The referenced content may have been created by other members or users of the system or network and/or the author of the deck being created or revised. The system or network may be a public system or network, such as the Internet or a private or proprietary system or network, such as an intranet. The network may be or may include a social network or other communications network in which the user or author is a member or participant.

In block 104, a mechanism to access each part of referenced content or ancillary content may be associated with the corresponding piece of leveraged content used in the deck. In some embodiments, a link may be associated with each piece of leveraged content that provides access to the corresponding part of referenced content or ancillary content. The link may be a uniform resource locator (URL) or other mechanism for accessing the referenced content or ancillary content from the corresponding leveraged content in the deck.

In accordance with an embodiment, selected pieces of leveraged content may be linked to corresponding parts of referenced content. For example, a user or author of the deck may consider that some leveraged content or pieces of leverage content do not need to be linked to the corresponding referenced content or ancillary content because the leveraged content may not need to be updated in response to changes in the referenced content or ancillary content for certain reasons. In other embodiments, each piece of leveraged content may be linked to the corresponding part of the referenced content or ancillary content. An advantage to this feature is that the user or author may then determine at a later time whether to actually update the particular piece of leveraged content with corresponding updated part of the referenced content or ancillary content.

In block 106, the deck may be stored in a memory associated with a computing device of the user or author of the deck. The link or mechanism for accessing a particular part of referenced content may also be stored in association with the corresponding piece of leveraged content in the deck.

In block 108, the deck may be published. In accordance with an embodiment, the deck may be published by making the deck available for access by any user or by chosen users in the system or communications network. For example, the deck may only be made available for participants or members of a particular communications network, social network, or a select group of users. In accordance with another embodiment, the deck may be published by actually transmitting the deck to chosen users or subscribers. In a further embodiment, the deck may be published by transmitting a notification of availability of the deck to chosen users or subscribers. The users or subscribers may then access the deck in response to the notification.

In block 110, each piece of content in the deck may be converted to plain text. This may include leveraged pieces of content and content that is not leveraged or content in the deck that does not make reference or use parts of existing content available in the system or on the network. The content may be converted to plain text by using a word recognition program or other software capable of scanning the pieces of content in the deck and converting the content to plain text.

In block 112, the link or mechanism for accessing the parts of the referenced content or ancillary content may be extracted from the corresponding pieces of leveraged content in the deck. As previously discussed, in some embodiments, selected pieces of the leveraged content may be linked to the corresponding part of referenced content or ancillary content on the system or network. In other embodiments, each piece of leveraged content may be linked to the corresponding part of referenced content or ancillary content to preserve the user's ability to selectively update any of the leveraged content in response to the corresponding part of referenced content or ancillary content being changed.

In block 114, the pieces of leveraged content may be configured for following the corresponding parts of referenced content or ancillary content to obtain updates or notifications of updates to the corresponding referenced content, parts of referenced content or ancillary content. The updates or notifications of updates are received by the respective pieces of leveraged content that correspond to each of the parts of referenced content or ancillary content. The updates or notifications of updates to the referenced content or ancillary content may be stored in a memory of the user's computer device in association with the corresponding piece of leveraged content or in another storage device on the system or network. In accordance with one or more embodiments, an integrated contextual activity stream may be created and associated with each piece of leveraged content that includes the updates or notifications of updates to the referenced content or ancillary content that corresponds to each piece of leveraged content. The integrated contextual activity stream may be stored in the memory of the user's computer device or in another storage device on the system or network. Embodiments of the invention in which the leveraged content is configured for following the referenced content rather than the user or author of the deck saves the user from the burden of personally having to follow multiple different parts of content that may be located at various locations in a system or on a network. Additionally, embodiments in which the updates or notifications of updates are used to create an integrated contextual activity stream avoids the user or author of the deck from having to stitch together or assemble the relevant updates and create a package of these updates that may relate to the leveraged content or some content that the user has created.

The leveraged content following the referenced content being used to obtain updates or notification of updated to the corresponding referenced content or ancillary content in block 114 may involve different operations or functions as described with reference to blocks 116-122 that may or may not be included in different embodiments.

In block 116, in accordance with one or more embodiments of the invention, the leveraged content following the referenced content may include the leveraged content automatically subscribing to receive updates or notifications of updates to the corresponding referenced content or ancillary content using the mechanism or link for accessing the referenced content or ancillary content. Each piece of leveraged content may subscribe to the corresponding part of the referenced content for receiving updates or notifications of updates or in other embodiments selected pieces of leveraged content may subscribe to the corresponding parts of the referenced content. Under some circumstances, the leveraged content may subscribe to ancillary content of the referenced content. The ancillary content may be material or content other than the original material or content available in the system or accessible over the communications network. For example, ancillary content may include but is not necessarily limited to comments related to the referenced content or other materials. The leveraged content or piece of leveraged content will then receive updates or notifications of updates to the corresponding part of the referenced content or ancillary content to which the leveraged content is subscribed. Updates to the referenced content or ancillary content may be detected by a detection module associated with the system and the detection module may instruct the referenced content to transmit the update or a notification of the update to the subscribing leveraged content or piece of leveraged content, or in other embodiments, the detection module or system may transmit the update or notification of update to the subscribing leveraged content. Embodiments of the invention in which the leveraged content is configured for following the referenced content by the leveraged content subscribing to updates to the reference data or ancillary data has the advantage of automatically providing updates to the user or author without the user having to perform any action or having to manually follow different content on the system or network.

In accordance with another embodiment, the leveraged content or piece or leveraged content may be modified to include a code segment that may generate and transmit a query at preset time intervals to the corresponding referenced content or part of referenced content or ancillary content to determine if the referenced content or ancillary content may have been updated. If the referenced content or ancillary content has been updated, the system may retrieve and transmit the update from the referenced content or ancillary content to the leveraged content or piece of leveraged content. In other embodiments, the referenced content or ancillary content that has been updated may be instructed to transmit the update or notification of the update to the corresponding leveraged content or piece of leveraged content. The update may then be stored in the memory in association with the leveraged content similar to that previously described. An integrated contextual activity stream may be created using the updates and associated with the particular leveraged content. The preset time interval for generating and transmitting the query may be adjusted by the user. The preset time interval may set according to an expected frequency of updates to the particular referenced content. For example, the preset time interval may be each day, after a preset number of days, etc.

In block 118, in accordance with some embodiments, the pieces of leveraged content in the deck that are following corresponding referenced content or parts of referenced content on the system or network for receiving updates or notifications of updates may be identified in the deck. The pieces of leveraged content that are following referenced content may be identified by a special marking in the deck. Accordingly, the pieces of leveraged content that are following referenced content are apparent to the user when the deck is viewed. The identification or marking may only be viewable by the author or in other embodiments may be viewed by any user or only those users authorized to view the identification or marking of the pieces of leveraged content following referenced content. Embodiments of the invention that include the feature of marking or identifying leveraged content in the deck have the advantage of facilitating viewing or selectively viewing the updates or integrated contextual activity stream that may have been created using the updates or notifications of updates for a particular piece of leveraged content. The user may selectively operate a feature associated with the particular piece of leveraged content for viewing the updates or integrated contextual activity stream.

In block 120, updates or notifications of updates to the referenced content or parts of referenced content may be received by the corresponding leveraged content in the deck in response to the leveraged content being configured to follow the referenced content or the leveraged content being subscribed to the referenced content. The updates or notifications of updates may be stored in a memory in association with the corresponding leveraged content.

In block 122, as previously discussed, an integrated contextual activity stream may be created for each piece of leveraged content that receives updates or notifications of updates from corresponding referenced content or part of referenced content. The integrated contextual activity stream may be stored in association with the associated leveraged content or piece of leveraged content in a memory on the system or on a computer device associated with the user. Embodiments of the invention that include the feature of creating an integrated contextual activity stream and storing the activity stream in association with the associated piece of leveraged content in the deck have the advantage of assembling the relevant updates or notifications of updates and providing a package of these updates or notifications that the user can utilize to easily and efficiently update the leveraged content in the deck. For example, the user or author may simply cut and paste the updates from the integrated contextual activity stream to the leveraged content in the deck and then perform any editing in the deck.

In block 124, the updates or notifications of updates to the referenced content or part of referenced content or ancillary content corresponding to a particular piece of leveraged content may be presented on a display of a computer device. The updates or notifications of updates may be presented automatically in response to presenting the deck in accordance with one or more embodiments. In another embodiment, the updates or notifications of updates may be presented in response to activating a particular feature associated with the leveraged content or piece of leveraged content.

In accordance with one or more embodiments, the integrated contextual activity stream may be presented containing the updates or notifications of updates. The integrated contextual activity stream may be presented automatically in response to presenting the deck or in response to activating a particular feature associated with the leveraged content or piece of leveraged content. The integrated contextual activity stream may include a list of updates or notifications of updates to the referenced content or ancillary content. The list of updates or notifications of updates may be in a particular order or ranking. For example, the updates or notifications of updates may be in chronological order, either from most recent to oldest or from oldest to most recent. In another embodiment, the updates or notifications of updates may also be listed in order of importance based on a predetermined criterion, such as subject matter of the update or other criteria. The integrated contextual activity stream may include a feature or mechanism for re-use or application of the updates in the deck. One advantage of these features is that a user can view a history or sequence of updates or notifications of updates to the referenced content. The user may edit the leveraged content in the deck based on the updates or notifications of updates to the corresponding referenced content, and/or the user may select which updates to the referenced content may be used to revise the corresponding leveraged content in the deck.

Figure 2:
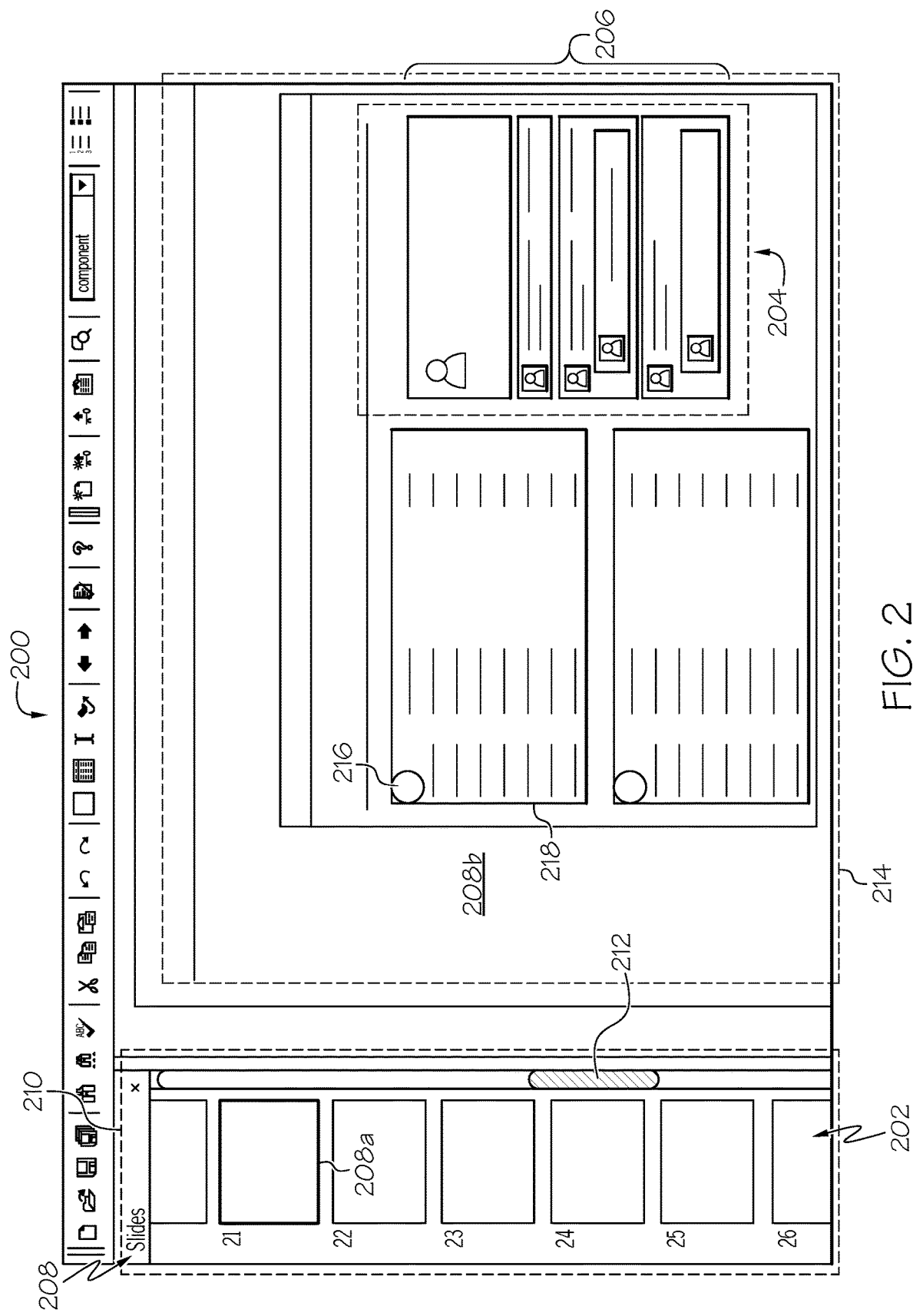
FIG. 2 is an example of a graphical user interface (GUI) including a deck and an integrated contextual activity stream including updates made to parts of referenced content that correspond to pieces of leveraged content in the deck in accordance with an embodiment of the present invention.

FIG. 2 is an example of a graphical user interface (GUI) 200 including a deck 202 and an integrated contextual activity stream 204 including updates 206 made to parts of referenced content that correspond to pieces of leveraged content in the deck 202 in accordance with an embodiment of the present invention. The deck 202 may include a plurality of slides 208. The slides 208 may be presented in sequential order in a first area 210 (represented by the dashed line in FIG. 2) on the left side of the GUI 200. The slides 208 may be displayed in a single column and a scroll mechanism 212 may be provided to move to view other slides 208 in the column if there are more slides in the deck 202 than can fit in the first area 210.

In the example of FIG. 2, a particular slide 208*a* in the deck 202 may be selected by the user using a computer pointing device or similar device associated with the user's computer system or client computer system similar to that described with reference to FIG. 4. The selected slide 208*a* may be highlighted or otherwise distinguished from the other slides 208 in the deck 202. An enlarged version 208*b* of the selected slide 208*a* may be presented in a second area 214 (enclosed in a chain line in FIG. 2) of the GUI 200. The integrated contextual activity stream 204 (enclosed in broken line 204 in FIG. 2) associated with the leveraged content or pieces of leveraged content in the slide 208*b* may be presented automatically in response to presentation of the selected slide 208*b* or in another embodiment, the integrated contextual activity stream 204 may be presented in response to activating a feature, such as a button 216 or other feature associated with the slide 208*b* or particular piece of leveraged content 218 in the slide 208*b*. The integrated contextual activity stream 204 may be superimposed on the slide 208*b* in a predetermined section of the second area 214 or may be presented in some other manner.

Figure 3:
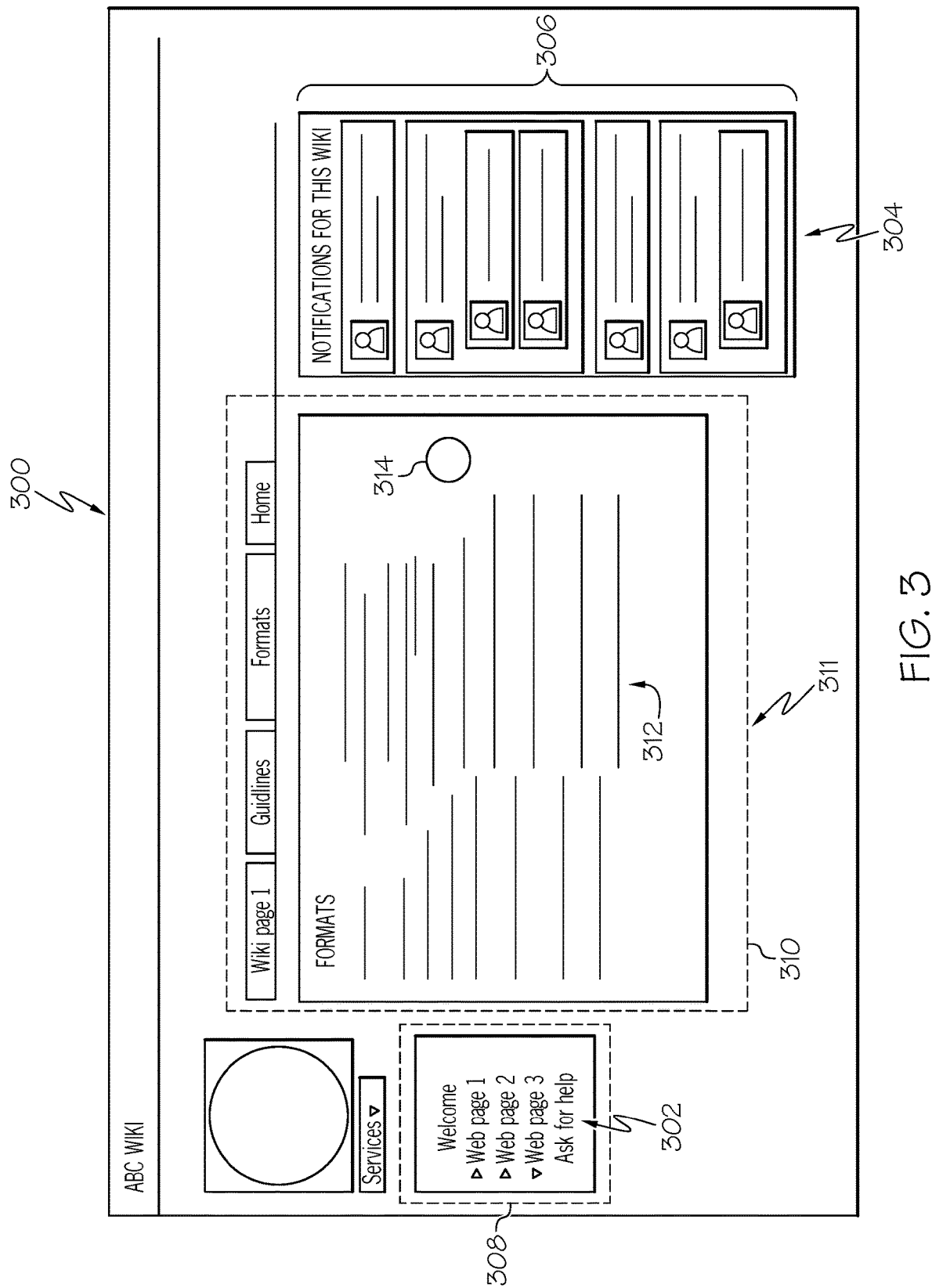
FIG. 3 is an example of a GUI including a deck and an integrated contextual activity stream including notifications of updates made to parts of referenced content that correspond to pieces of leveraged content in the deck in accordance with another embodiment of the present invention.

FIG. 3 is an example of a GUI 300 including a deck 302 and an integrated contextual activity stream 304 including notifications of updates 306 made to parts of referenced content that correspond to pieces of leveraged content in the deck 302 in accordance with another embodiment of the present invention. As previously described, referenced content or parts of referenced content may be content that is available on a system or via a network. In the example of FIG. 3, the deck 302 may be a wiki including a plurality of wiki pages. A wiki is a web application which allows people to add, modify or delete content in collaboration with others. A listing of the pages 308 (enclosed in a dashed line in FIG. 3) of the wiki or deck 302 may be presented in one portion of the GUI 300, for example, on a left side of the GUI 300 as shown in the exemplary GUI 300 in FIG. 3. A particular wiki page 310 (enclosed in a chain line in FIG. 3) may be selected from the listing of pages 308 of the deck 302 and presented in a main or central area 311, for example, of the GUI 300 as shown in the example in FIG. 3. Content or pieces of content 312 on the particular page 310 of the deck 302 or wiki may use or leverage content derived from other sources available in a system or network which may be referenced content as described herein. Notifications of updates 306 to the referenced content or parts of referenced content may be listed in the integrated contextual activity stream 304. The integrated contextual activity stream 304 may be presented in a further portion of the GUI 300, for example, on a right side of the GUI 300 as shown in the exemplary GUI 300 in FIG. 3. The integrated contextual activity stream 304 may be presented automatically in association with the leveraged content being selected and presented in the main or central area 311 of the GUI 300 or in response to activation of a feature, such as a button 314 or other mechanism, associated with the leveraged content in the deck 302.

Figure 4:
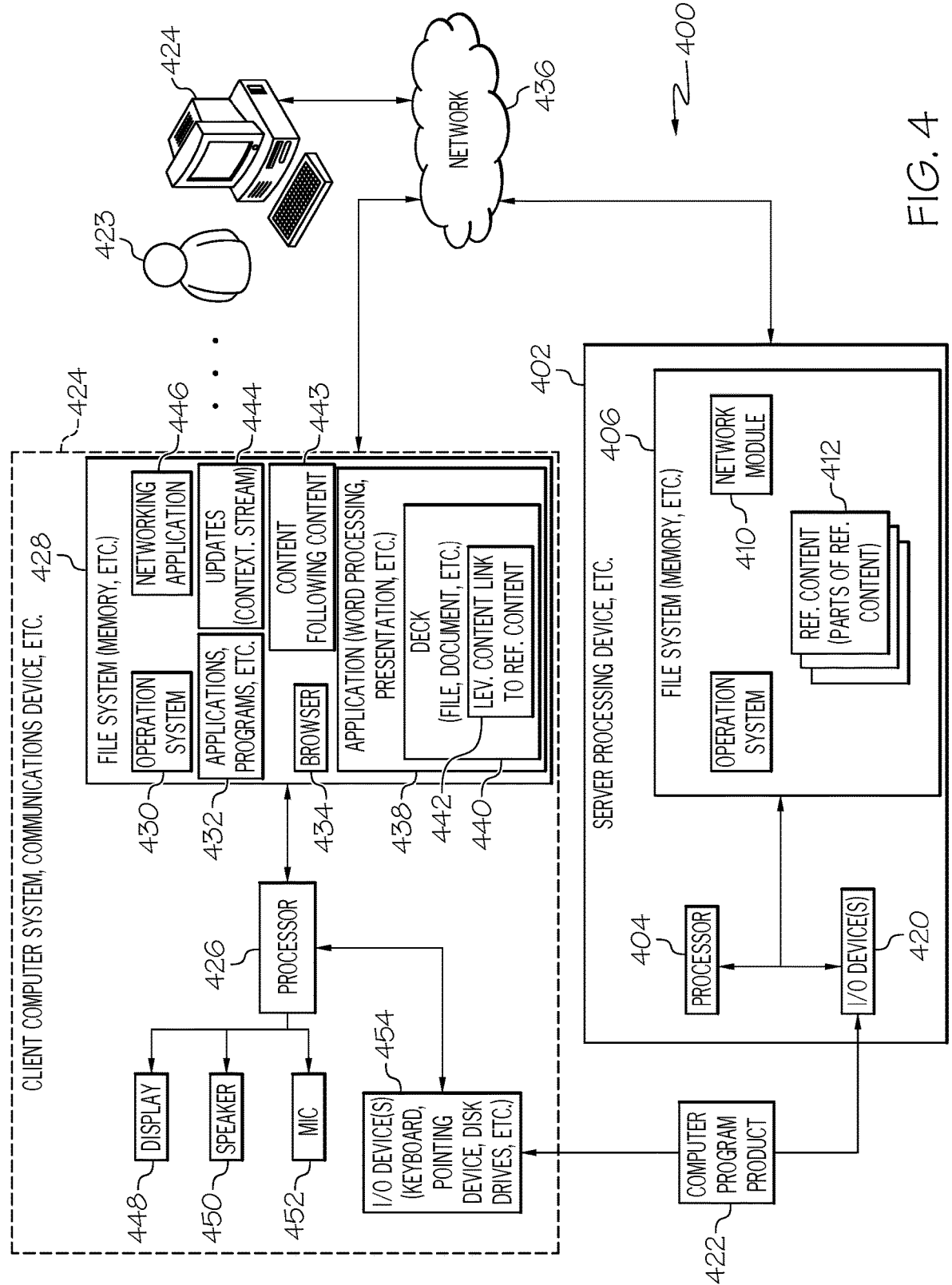
FIG. 4 is a block schematic diagram of an example of a system for content following content to provide updates made to parts of referenced content that correspond to pieces of leveraged content in a deck in accordance with an embodiment of the present invention.

FIG. 4 is a block schematic diagram of an example of a system 400 for content following content to provide updates made to parts of referenced content that correspond to pieces of leveraged content in a deck in accordance with an embodiment of the present invention. The method 100 of FIGS. 1A-1B may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to providing updates or notification of updates for pieces of leveraged content in a deck. The processing device 402 may also include a file system 406 or memory. An operating system 408, applications and other programs may be stored on the file system 406 for running or operating on the processor 404. A networking module 410 or system may also be stored on the file system 406 and may be compiled and run on the processor 404 to perform the functions for providing updates or notifications of updates for pieces of leveraged contend in a deck similar to that described herein. The networking module 410 may be any type of online communications mechanism for online communications or conversations. The method 100 of FIGS. 1A-1B may be embodied in the networking module 410 and performed by the processor 404 when the networking module 410 is compiled and run on the processor 404.

Referenced contents 412 or parts of referenced contents may also be stored in a database in the file system 406 or memory.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the social networking module 410 or system. At least one of the I/O devices 420 may be a device to read a computer program product, such as computer program product 422. The computer program product 422 may be similar to that described in more detail herein. The networking module 410 may be loaded on the file system 406 from a computer program product, such as computer program product 422.

A member of a network, such as a social network, or user 423 of the system 400 may use a computer system 424 or communications device to access the processing device 402 or server and networking module 410 or system. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

In accordance with an embodiment, an application 438 for preparing a document, presentation or other work may also be stored on the file system 428 and operate on the processor 426 of the user's computer system 424. A deck 440 may be created using the application 438. The deck 440 may include a file, a document, a presentation or other work that may include a plurality of pieces of content. Some of the pieces of content may use or leverage content that may be available from other sources in the system 400 or accessed via the network 436. As defined herein, the content or pieces of content in the deck 440 that use or leverage other content on the system or network may be referenced content and the pieces of content in the deck may be defined as leveraged content 442.

A content following content application or module 443 may also be stored on the file system. The method 100 in FIG. 1 or at least portions of the method 100, for example blocks 114-124, may be embodied and performed by the content following content application or module 443. The content following content may configure the leveraged content or pieces of leveraged content for following the corresponding referenced content or parts of the referenced content similar to that described herein. In accordance with an embodiment, a link or other mechanism for following the referenced content by the corresponding leveraged content 442 may be associated with the leveraged content. The link may be stored in a database of the file system 428 in association with the leveraged content 442. Updates 444 or notifications of updates received by the leveraged content in response to following the referenced content may be stored on the file system 428. Similar to that previously described, an integrated contextual activity stream including the updates 444 or notification of updates may be created and stored on the file system 428. The integrated contextual activity stream may be provided to the user in response to a predetermined action or event as described herein.

Embodiments of the invention including the content following content feature that configures leveraged content for following referenced content as described herein represents a significant technical improvement to providing updates to content and avoids the burden for the user or author having to follow multiple different parts of content that may be located at various locations in a system or on a network. Additionally, the feature of creating an integrated contextual activity stream of the updates or notifications of updates represents another technical improvement that avoids the user or author of a deck having to stitch together or assemble relevant updates and create a package of these updates that may relate to content that the user has created. The referenced content is automatically organized in association with the corresponding leveraged content in the deck as a result of the content following content and creation of the integrated contextual activity stream.

A networking application 446 may also be stored on the filed system 428. The networking application 446 may be compiled and run on the processor 426 to perform a set of the functions such as publishing the deck, obtaining updates or notifications of updates for pieces of leveraged contend in the deck similar to that described herein. The networking application 446 may be any type of online communications mechanism for online communications or conversations. The networking application 446 operating on the computer system 424 may interface with or operate in conjunction with the networking module 410 or system on the processing device 402 or server to perform the functions and operations described herein for providing updates or notifications of updates for pieces of leveraged content in a deck. Accordingly, networking application 446 operating on the computer system 424 may perform some of the functions and operations of the method 100 and networking module 410 operating on the server 402 may perform other functions of the method 100. Some embodiments of the present invention may include only the networking module 410 on the processing device 402 or server, and other embodiments may include only the networking application 446 operating on the client computer system 424 or communications device.

The client computer system 424 may also include a display 448, a speaker system 450, and a microphone 452 for voice communications. One or more user interfaces may be presented on the display 448 for controlling operating the networking module 410 and networking application 446 and for performing the operations and functions described herein.

The computer system 424 may also include one or more input devices, output devices or combination input/output devices, collectively I/O devices 454. The I/O devices 454 may include a keyboard or keypad, pointing device, such as a mouse, disk drives and any other devices to permit a user, such as user 423, to interface with and control operation of the computer system 424 and to access the networking application 446 and networking module or system 410 on server 402. The I/O devices 454 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for providing updates for pieces of content in a deck comprising:

creating, by a processor, a deck, the deck comprising a plurality of pieces of content, wherein the deck is a word processing document or a presentation document;

using existing content, that existed on a network before creation of the deck, for at least one of the pieces of content in the deck, the existing content in the deck being leveraged content and the existing content on the network being referenced content;

configuring, by the processor, the leveraged content in the deck for following the referenced content on the network or ancillary content of the referenced content on the network to obtain updates to the referenced content or the ancillary content on the network, wherein configuring the leveraged content to follow the referenced content or the ancillary content comprises automatically subscribing a particular leveraged content of the plurality of pieces of content in the deck to receive updates to the referenced content or the ancillary content on the network that corresponds to the particular leveraged content;

creating an integrated contextual activity stream, the integrated contextual activity stream comprising a list of the updates or notifications of updates to the referenced content or the ancillary content, the updates or notifications of updates are listed in an order of importance based on a subject matter of the updates;

receiving, by the processor, an update to the referenced content or the ancillary content on the network, wherein the update is a change to the referenced content or the ancillary content on the network;

prior to modifying the leveraged content to incorporate the update, concurrently presenting, by the processor, (i) the update to the referenced content or the ancillary content on the network and (ii) the leveraged content; and after concurrently displaying (i) the update and (ii) the leveraged content, modifying, by the processor, the leveraged content to incorporate the update.

2. The method of claim 1, further comprising providing a feature associated with the integrated contextual activity stream for incorporating the updates to the referenced content or the ancillary content in the deck.

3. The method of claim 1, identifying the leveraged content in the deck, that is subscribed to corresponding referenced content or the ancillary content, by a special marking in the deck so that the leveraged content is apparent to a user when the deck is viewed by the user.

4. The method of claim 3, further comprising:
storing in a memory the update in association with the leveraged content.

5. The method of claim 4, wherein the update to the referenced content or the ancillary content is presented in response to a predetermined action.

6. The method of claim 5, wherein the predetermined action comprises presenting the leveraged content, or activating a feature in a graphical user interface associated with the leveraged content.

7. The method of claim 1, wherein configuring the leveraged content to follow the referenced content comprises associating a link to the referenced content or the ancillary content with the leveraged content.

8. The method of claim 7, further comprising storing in a memory the link to the referenced content or the ancillary content with the associated leveraged content.

9. The method of claim 8, further comprising:
converting each piece of content in the deck to plain text;
extracting the link to the referenced content or the ancillary content from the leveraged content; and
subscribing the leveraged content to receive the updates to the referenced content or the ancillary content.

10. The method of claim 9, further comprising:
receiving the updates to the referenced content or the ancillary content; and
storing in a memory the updates in association with the leveraged content.

11. The method of claim 10, further comprising presenting the updates to the referenced content or the ancillary content in response to a predetermined action.

12. The method of claim 10, further comprising:
creating an integrated contextual activity stream, the integrated contextual activity stream comprising a list of the updates to the referenced content in a particular order or ranking; and
providing the integrated contextual activity stream in association with the leveraged content in response to a predetermined action, wherein the predetermined action comprises one of automatically presenting the integrated contextual activity stream when presenting the associated leveraged content or presenting the integrated contextual activity stream in response to activating a feature on a graphical user interface associated with the associated leveraged content.

13. The method of claim 1, further comprising modifying the leveraged content to comprise a code segment that generates and transmits a query at preset time intervals to referenced content on the network or the ancillary content to determine if the referenced content or ancillary content has been updated.

14. The method of claim 1, wherein configuring the leveraged content to follow the referenced content comprises associating a link to the referenced content or the ancillary content with the leveraged content, wherein the leveraged content is configured to be selectively updated with the referenced content or the ancillary content by a user or author using the link in response to a change in the referenced content or the ancillary content.

15. The method of claim 1, wherein the leveraged content being configured to follow the referenced content or the ancillary content saves a user from a burden of having to personally follow multiple different parts of content at various locations on the network.

16. The method of claim 1, wherein the deck is an electronic document.

17. The method of claim 1, wherein concurrently presenting (i) the update to the referenced content or the ancillary content on the network and (ii) the leveraged content comprises concurrently displaying the update to the referenced content or the ancillary content on the network on a first area of a graphical user interface and the leveraged content on a second area of the graphical user interface.

\* \* \* \* \*